United States Patent [19]

Bustamante

[11] Patent Number: 5,522,213

[45] Date of Patent: Jun. 4, 1996

[54] HYDRAULIC MOTOR SWASH PLATE ANGLE SHIFTER

[76] Inventor: Ralph Bustamante, 4625 Rosebush Road, Mississauga, Ontario, Canada, L5M 5H2

[21] Appl. No.: 396,753

[22] Filed: Mar. 1, 1995

[51] Int. Cl.⁶ .................................................... F16D 39/00
[52] U.S. Cl. .................. 60/487; 91/505; 74/481; 60/327
[58] Field of Search .................. 60/443, 487, 327; 91/504, 505, 506; 74/481, 482

[56] References Cited

U.S. PATENT DOCUMENTS

| | | | |
|---|---|---|---|
| 3,129,604 | 4/1964 | Hanson | 74/482 |
| 3,316,773 | 5/1967 | Findlay | 74/481 |
| 3,508,454 | 4/1970 | Fanslow et al. | 74/482 |
| 3,511,105 | 5/1970 | Matter | 74/481 |
| 4,217,789 | 8/1980 | Larson | 74/482 X |
| 4,553,626 | 11/1985 | Kazmierczak | 74/482 X |
| 5,105,689 | 4/1992 | Korsmeyer | 74/482 X |

*Primary Examiner*—Hoang Nguyen
*Attorney, Agent, or Firm*—Eugene J. A. Gierczak

[57] ABSTRACT

A speed control shifter is provided for use with an hydraulic automotive drive train. The shifter is intended for co-axial mounting on an existing variable speed reciprocating hydraulic pump swash plate angle control shaft. It employs a pair of input plates each intermittently connected to an output plate rigidly connected to the shaft. One input plate is connected to a speed selector handle, the other input plate is linked to an accelerator cable. When starting from neutral activation of one solenoid causes the position of the output plate, and hence the swash plate, to be controlled by motion of the accelerator cable. This allows the automobile to move away from a stopped position as the engine accelerates from idle. Once a first chosen speed range is reached a second solenoid is activated to link the motion of the output plate to the position of the speed selector, and the first solenoid is de-activated to permit normal increases and decreases in speed within the chosen speed range.

15 Claims, 11 Drawing Sheets

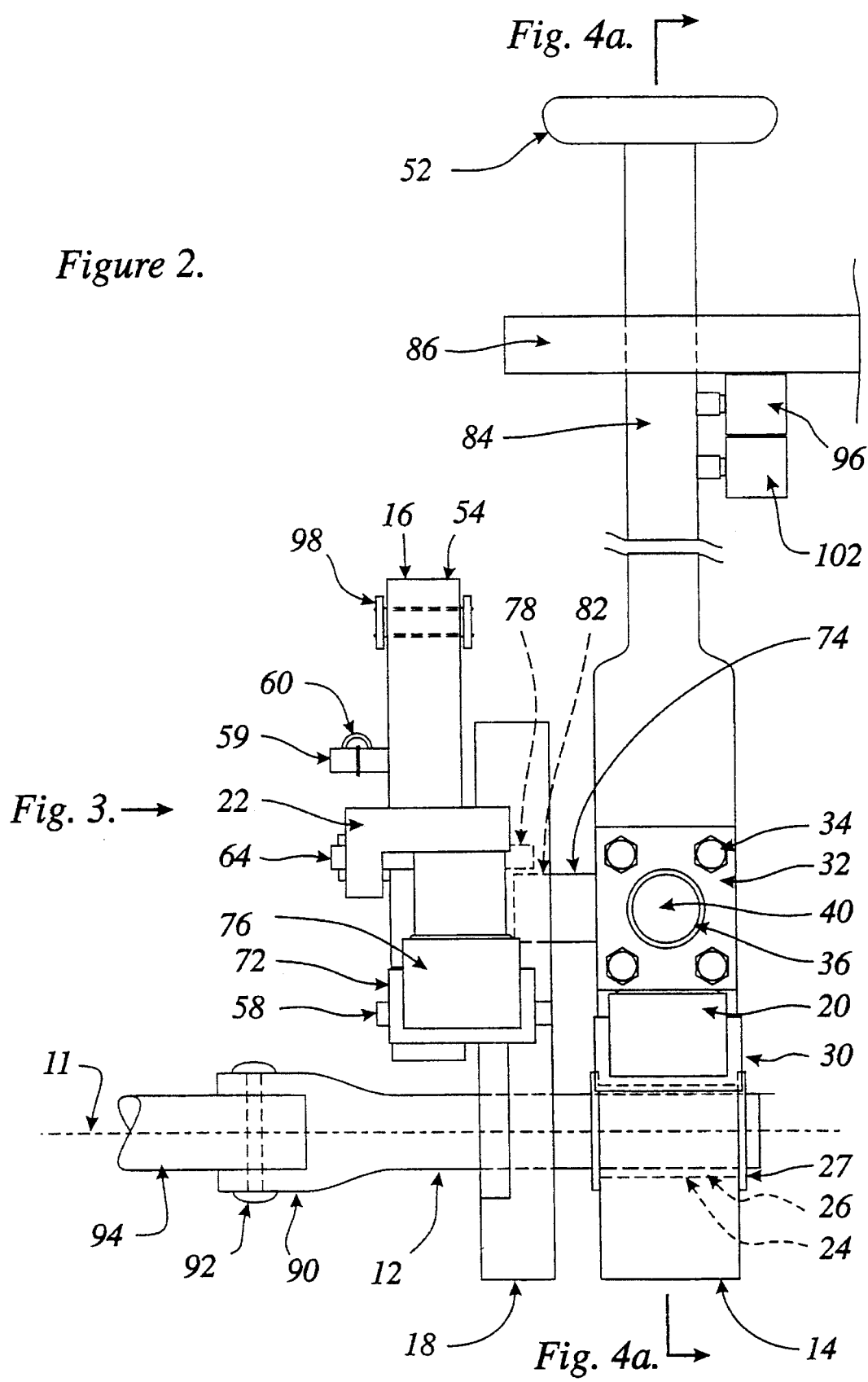

HYDRAULIC MOTOR SWASH PLATE ANGLE SHIFTER

DESCRIPTION

1. Field of Invention

This invention relates to the field of speed selector mechanisms akin to gear shifts, and in particular, to a speed selectors for controlling the movement of a hydraulic pump swash plate to prevent sudden pressure surges. The present invention relates more particularly to a small hydraulic automotive transmission.

2. Background Art

Hydrostatic pumps have been known for many years. Typically a motor drives an hydraulic pump at roughly constant speed. The hydraulic pump is connected to an hydraulic ram or to an hydraulic motor. The flow of hydraulic fluid is controlled by a system of valves, in which, typically, the flow to the hydraulic motor is regulated to control speed, and any excess flow is allowed to flow back to a reservoir, or sump.

Frequently hydraulic motors are used to move heavy equipment, generally at relatively slow speeds. General automotive use is less common. In the case of a small automobile it is advantageous to be able to run an hydraulic pump and motor combination through several speed ranges, in a manner analogous to the speed ranges corresponding to traditional standard gearbox transmissions. Many hydraulic pumps include a variable angle swash plate which may be adjusted to achieve various torque and speed range combinations.

The use of standard swash-plate type hydraulic pumps for automotive use is complicated by two common operating features. First is the tendency to run these pumps at one constant speed. Constant, governed speed devices have the advantage of reliability and economy, since a static installation can be chosen to operate at the point of optimal efficiency, and long operation at one, modest speed often leads to long service life. However, automotive use generally requires many starting and stopping cycles in which an engine does not operate continually at its one, optimal, steady operating speed. A variable speed device is desired. Second, swash plate control shift levers often move the swash plate in discrete intervals from one fixed detent angle to the next fixed detent angle. These discrete intervals are analogous to the gears of a standard transmission.

Sudden changes in swash plate angle are often associated with pressure surges in the hydraulic systems, which tend to damage seals and hoses. This pressure surge phenomenon is most pronounced at transition from a stopped, or neutral position into a low speed swash plate angle since a small swash plate angle and high engine speed will generate maximum torque at minimum flow. For automotive use it is advantageous to employ a shifter that will make the transition from a stopped condition to first speed as smoothly as possible.

SUMMARY OF THE INVENTION

The present invention relates to a speed control shifter for an hydraulically powered automobile to provide smooth starting torque with limited pressure surges.

In a first aspect of the invention there is provided an hydraulic shifter for use with a variable speed hydrostatic pump driven by an engine comprising a fuel flow control, the pump comprising a swash plate and a swash plate angle adjustment shaft extending along an axis of rotation, the shifter comprising an output plate fixedly mounted to the adjustment shaft, a first input plate, a second input plate, a first interconnection means for detachably linking the output plate to the first input plate, a second interconnection means for detachably linking the second input plate to the output plate, the first interconnection means movable from a first, unlocked position, in which said motion of the output plate is independent of the motion of the first input plate, and a second, locked position in which the output plate moves with the first input plate; the second interconnection means movable from a first, engaged position in which motion of the second input plate in a least one direction causes the output plate to move to a larger swash plate angle position, to a second, disengaged position in which motion of the output plate is independent of motion of the second input plate.

The invention may further include the first input plate comprising a speed selection handle and the second input plate being linked to the fuel flow control, the speed selection handle being movable to at least one forward speed position and to at least one neutral position, the second input plate being movable to an idle position and to at least one operating position, the first interconnection means including a first solenoid and a first mircoswitch, the second interconnection means including a second solenoid and a second microswitch; the first and second microswitches being able to be closed by motion of the handle from the neutral position to the forward position, and in which the output plate comprises a cam member, the first input plate comprises a cam follower passage, the first interconnection means comprises a cam follower disposed for sliding motion within the passage and for riding upon the cam member when so disposed, and a first solenoid movable from a retracted position to an extended position, and when the first solenoid is in the extended position it obstructs the passage to limit motion of the cam follower.

BRIEF DESCRIPTION OF DRAWINGS

FIG. 1, being

FIG. 2 is a rearward facing elevation of the shifter of FIG. 1.

FIG. 4, being

DESCRIPTION OF THE INVENTION

The present invention may be best understood with reference to the above noted figures in which like features have like numbers.

Figure 1A:
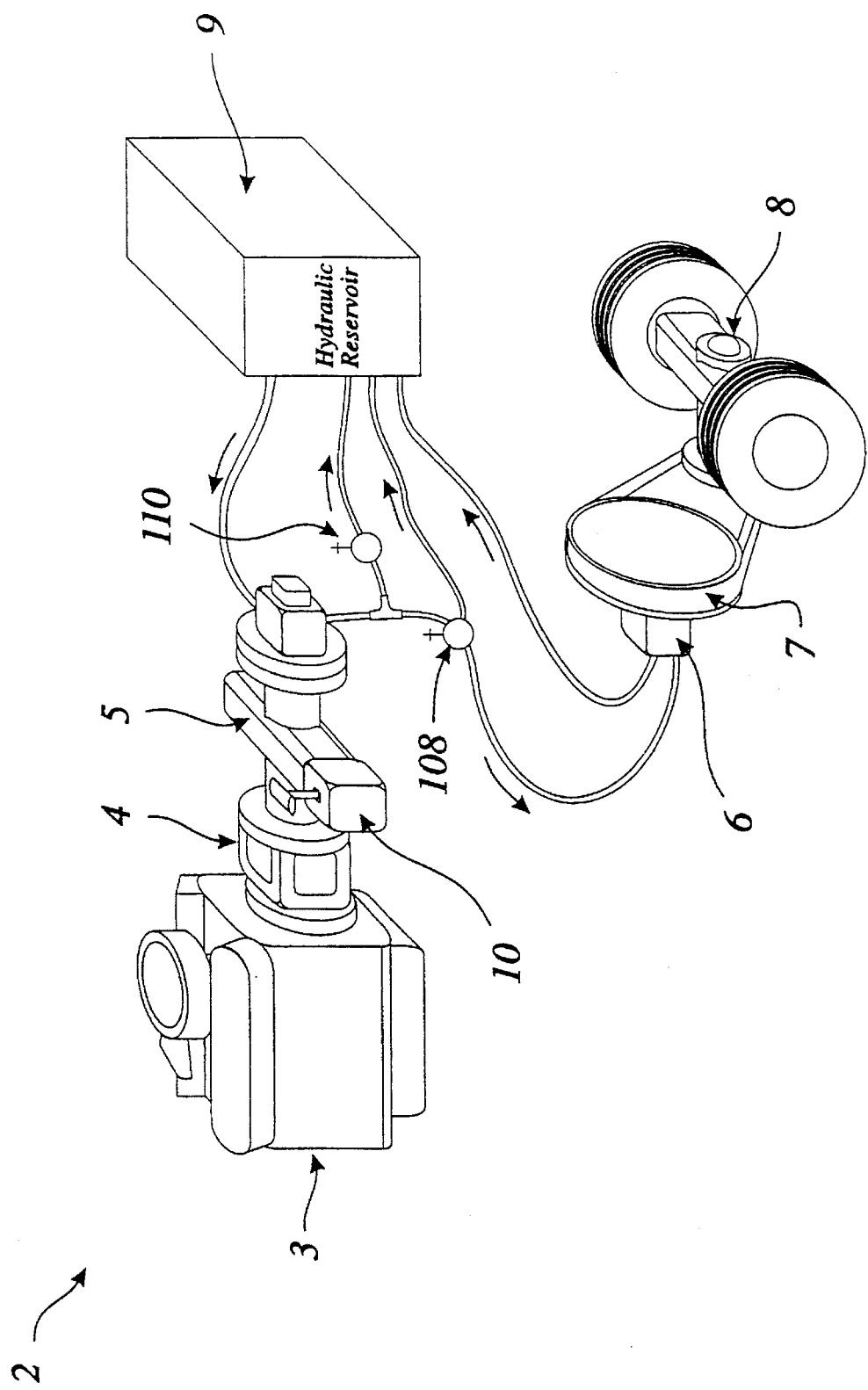
FIGS. 1a and 1b, shows general schematic drawings of two embodiments of automotive hydraulic systems comprising the shifter of the present invention.
Figure 1B:
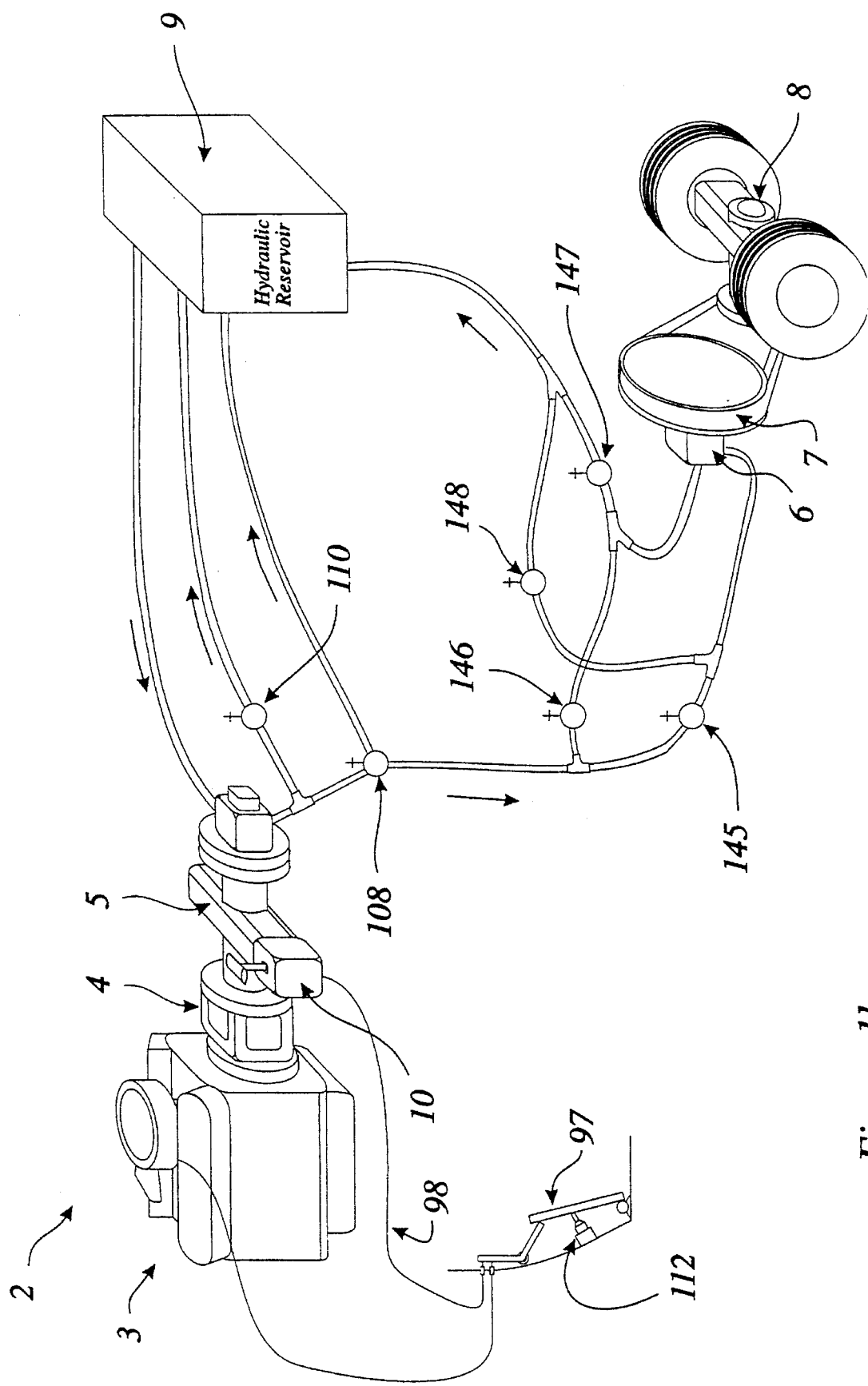

Commencing with FIG. 1, an automotive application for a hydraulic motor drive train is shown generally as 2. It comprises an engine 3, a flexible coupling 4, a variable speed hydrostatic pump 5, an hydraulic motor 6, a gear increaser 7, an automotive transaxle 8, an hydraulic reservoir 9, and the shifter of the present invention 10.

As shown in FIG. 2, the shifter 10 comprises a stub shaft 12, a first input plate 14, a second input plate 16, a third, output plate 18, a first interconnecting means, being a solenoid 20, and a second interconnecting means 22.

Figure 4A:
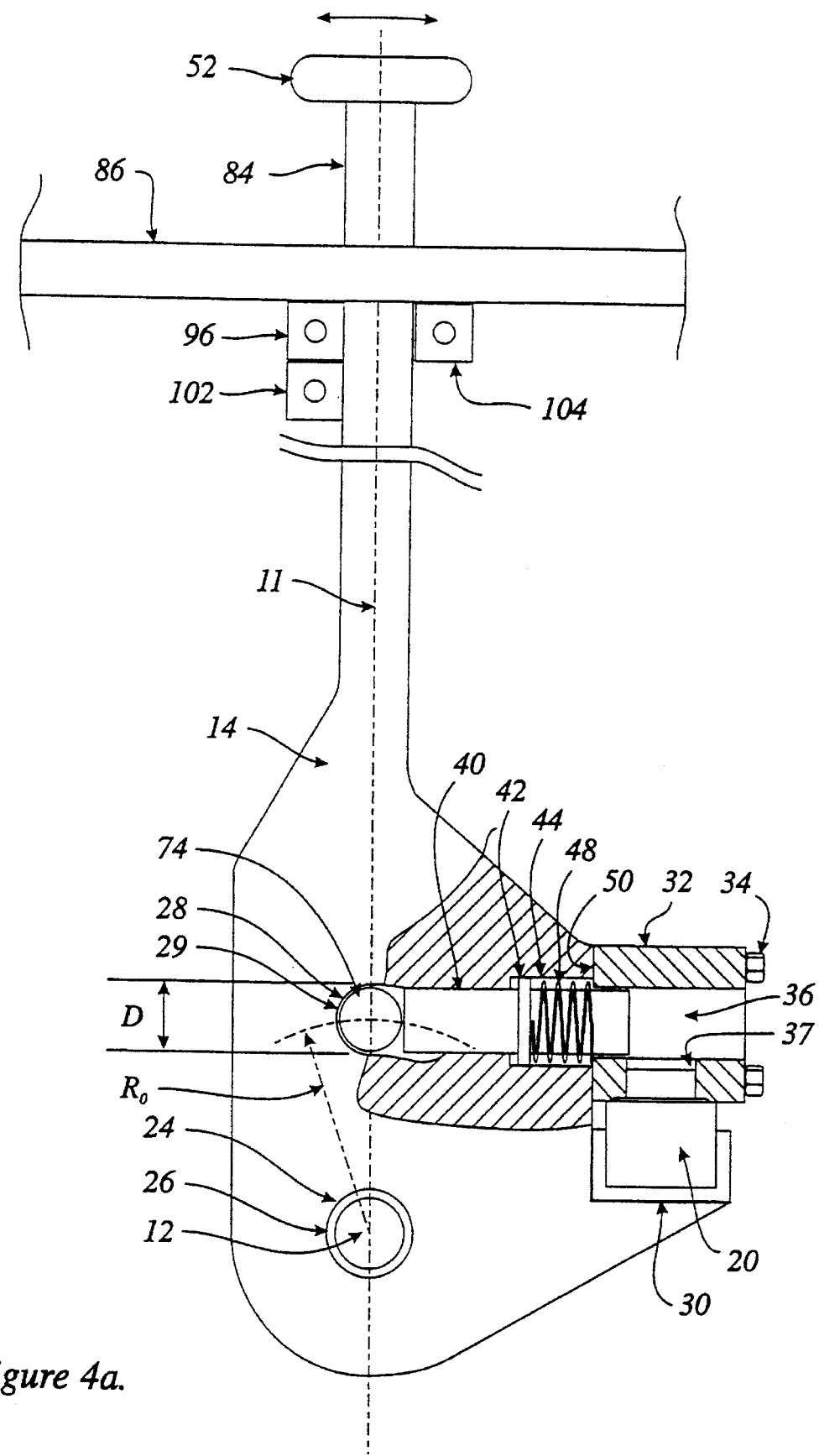
FIGS. 4a, 4b, 4c, and 4d, is a series of three cross sectional views showing the operation of the shifter of FIG. 1, and a fourth, corresponding view of a second embodiment of the shifter of FIG. 1.

As shown in FIG. 4a, a view taken on Section 'A—A' of FIG. 2, the first input plate 14 comprises a through hole 26, a bushing 27 snugly insertable within through hole 26 for pivotable location about stub shaft 12, a kidney shaped slot 28, having a reverse end radius 29 as will be explained below, a first solenoid support base 30, a main pin backshell 32 held in place by four cap screws 34, a cylindrical passage 36 centrally located to traverse backshell 32 and extending transversely through the body of plate 14 to intersect kidney shaped slot 28, a vertical aperture 37 traversing backshell 32 to debouch upon passage 36 to permit travel of the core of first solenoid 20 therethrough, a main pin 40 slidable within said cylindrical passage 36, the main pin 40 comprising a flange 42 of suitable dimension to slide within an enlarged cylindrical cavity 44, a spring 48 for engagement of flange 42 and also for reacting engagement with a shoulder 50 of backshell 32, and a shift handle 52 to be grasped by an operator for selection of a particular operating regime of drive train 2. The shift handle may be a monolithic extension of plate 14, as illustrated, or it may comprise one or more linkages, bell-cranks, connecting rods and the like.

Figure 3:
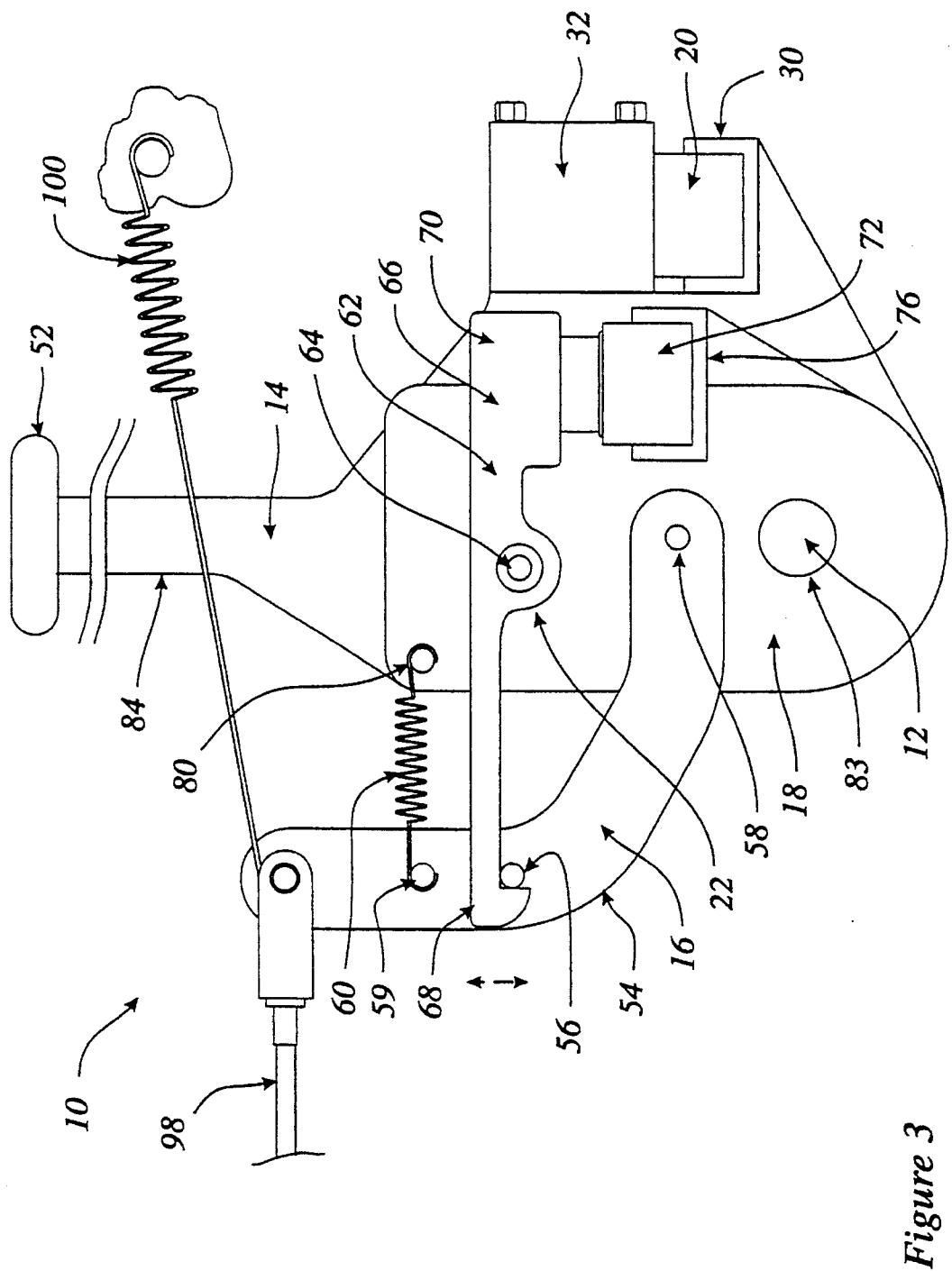
FIG. 3 is a profile view of the shifter of FIG. 1.

FIG. 3 shows a similar view taken on Arrow 'B' of FIG. 2. In the foreground, second input plate 16 comprises a rigid member 54, a catch pin 56, a pivot pin 58, a fastening point 59, and a return spring 60 flexibly attached to fastening point 59.

Further, second interconnecting means 22 comprises a latch, 62, having an axle, or fulcrum 64, a first pivot arm 66 to one side of fulcrum 64, a hook 68 to the other side of fulcrum 64, a counterweight 70 attached to first pivot arm 66, and a solenoid 72 disposed to cause latch 62 to pivot about fulcrum 64.

Output plate 18 comprises second pin 74, second solenoid support base 76, a blind hole 78, a pin 80 about which an end of return spring 60 is caught, a blind hole 82 in which an end of second pin 74 is fixedly seated and a through hole 83 by which means output plate 18 may be located about stub shaft 12.

Figure 5A:
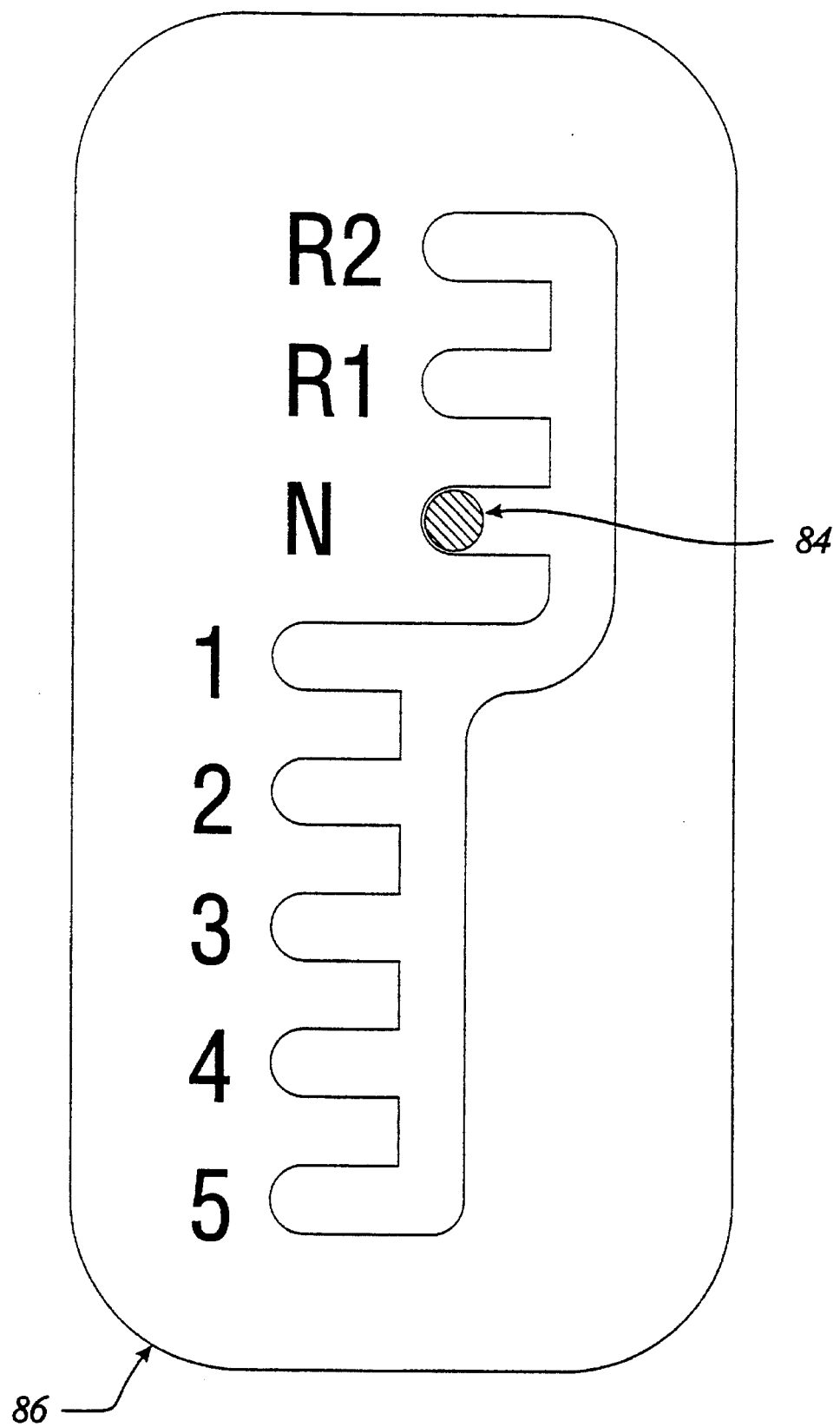
FIG. 5a is a view of the control quadrant of the shifter of FIG. 1.
Figure 5B:
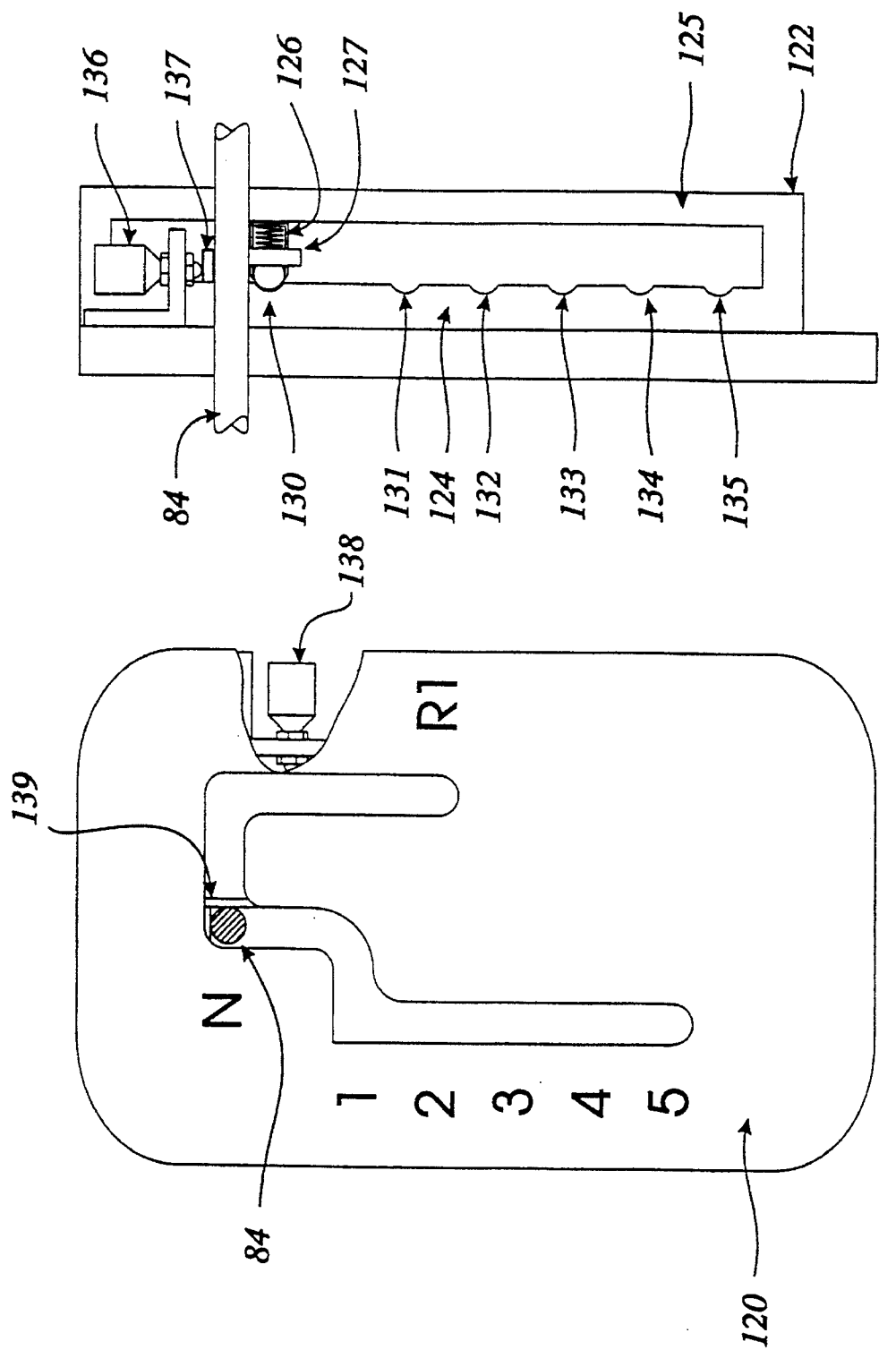
FIG. 5b shows details of a speed selection quadrant.

Finally, shift handle 52 comprises an extended shaft 84, which cooperates near its upper end with a selector quadrant 86 as shown in FIG. 5 with indent settings for a Neutral position, indicated as N, two settings in a reverse speed range indicated as R1 and R2, and five forward settings corresponding to increasing speed designated 1, 2, 3, 4, and 5 on the selector quadrant face. Shaft 84 is sufficiently long that it may flex significantly to be moved in and out of the detent positions shown on quadrant 86, and is correspondingly spring biased by its own resilience to remain in those detents under normal conditions.

The assembly and operation of these various components will now be described. As will be noted, stub shaft 12 comprises a socket 90 and a transverse locking device, such as a pin 92 for receiving and locking the extending end of a swash plate angle control shaft 94 of the variable speed hydrostatic pump 5. Thus the stub shaft 12 and the swash plate angle control shaft share the common centreline or axis of rotation 11, and due to pin 92, any rotation of the stub shaft will result in a corresponding rotation of the swash plate inducing a change in the amplitude of displacement of pistons within the pump as is well known in the art.

Stub shaft 12 traverses hole 83 of output plate 18 such that plate 18 lies in a plane substantially perpendicular to the axis of rotation of stub shaft 12. Plate 18 is rigidly affixed to stub shaft 12, typically by such means as welding so that any rotational motion of plate 18 will be carried by stub shaft 12 to swash plate control shaft 94.

Second pin 74 is rigidly fixed within plate 18 such that motion of plate 18 about axis 11 will cause the centre of second pin 74 to sweep out a part of a circular arc having a radius of $R_0$ measured from axis 11. First input plate 14 is pivotally disposed about stub shaft 12 on bushing 24. It is not fixed with respect to stub shaft 12. The kidney shaped aperture 28 is cut into first input plate 14 with a width 'D' corresponding to, but slightly greater than, the width of second pin 28, and with a central radius also of dimension $R_0$ from axis 11. Second pin 74 extends perpendicularly from output plate 18 parallel to axis 11 substantially to traverse the plane of rotation of first input plate 14 such that it registers within, and permitted a limited range of motion within, kidney shaped slot 28.

First solenoid 20 is seated on support base 30 such that the core of first solenoid 20 can extend across aperture 37 to at least partially obstruct hollow passage 36, thereby obstructing the outward sliding motion of main pin 40. When the core of solenoid 22 is retracted main pin 40 is free to slide outward beyond the inner edge of aperture 37, and thereby similarly to obstruct aperture 37 to prevent the extension of the core of solenoid 20.

Hollow passageway 36 is oriented to lie in the mid-plane of first input plate 14 and it, and main pin 40, are of such diameter that a projection along the longitudinal dimension of hollow cylinder 36 will under all circumstances intersect the periphery of second pin 74, and more so, when main pin 40 is forced inward along cylindrical passage 36 the flat end of main pin 40 will always form a line of contact against second pin 74. To ensure that main pin 40 rides on the side of second pin 74 in this way a spring biasing means is provided. Many such spring biasing means are known to those skilled in the art. One such means is to provide main pin 40 with a circumferential flange, slidable within a cavity 44 for engaging one end of spring 48. The other end of spring 48 is pressed against the inner face, or shoulder 50, of backshell 32. The force in spring 48 will tend to force main pin 40 against the side of second pin 74.

As illustrated in the series of views of FIG. 4, and commencing with FIG. 4a, in a first position, in which handle 52 is in a position corresponding to detent position N, for Neutral, second pin 74 lies next to the reverse wall radius 29 of kidney shaped slot 28. Main pin 40 lies inward of aperture 37 so that the core of first solenoid 20 is free to extend or retract as desired.

Figure 4B:
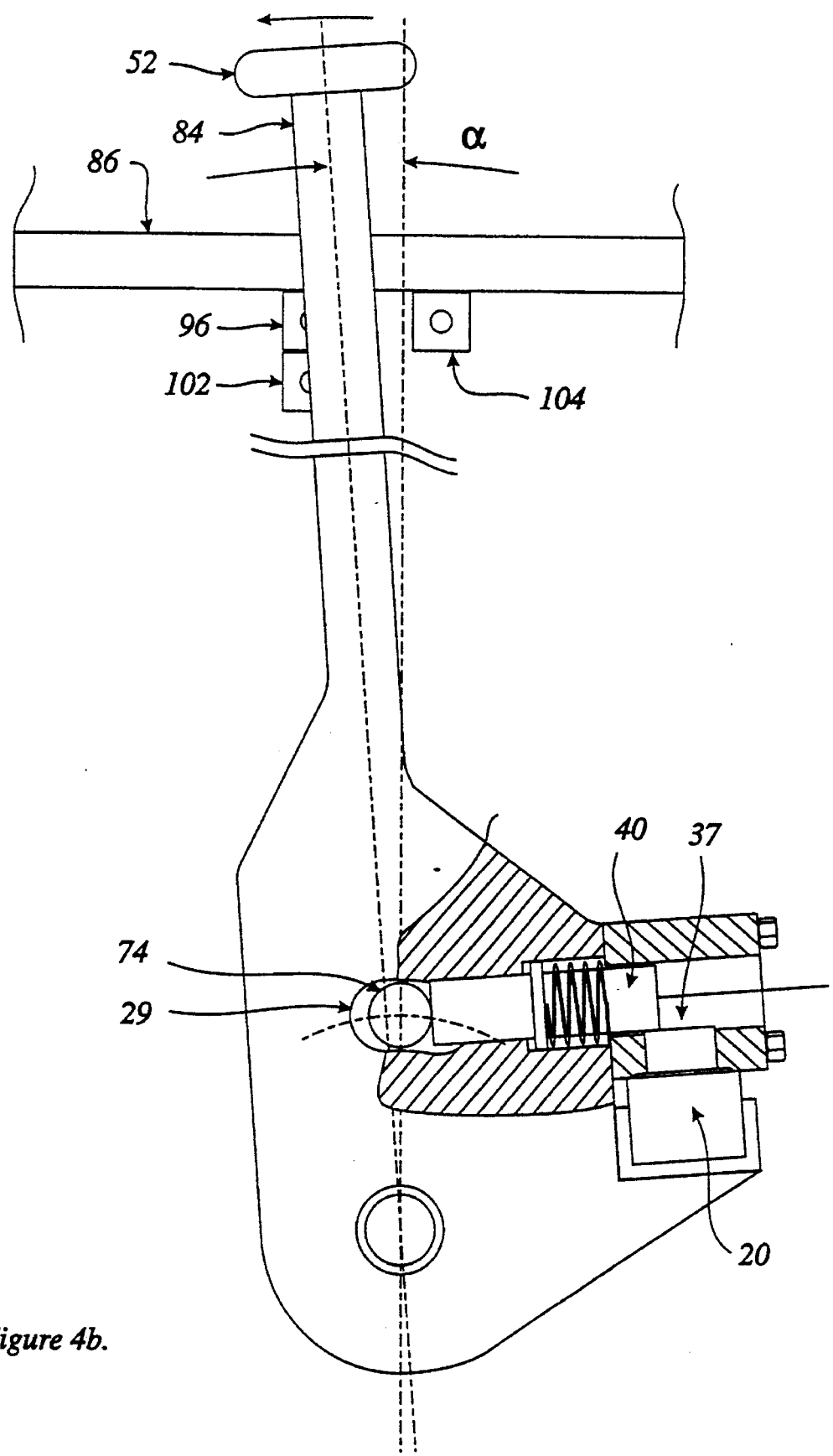
Figure 4C:
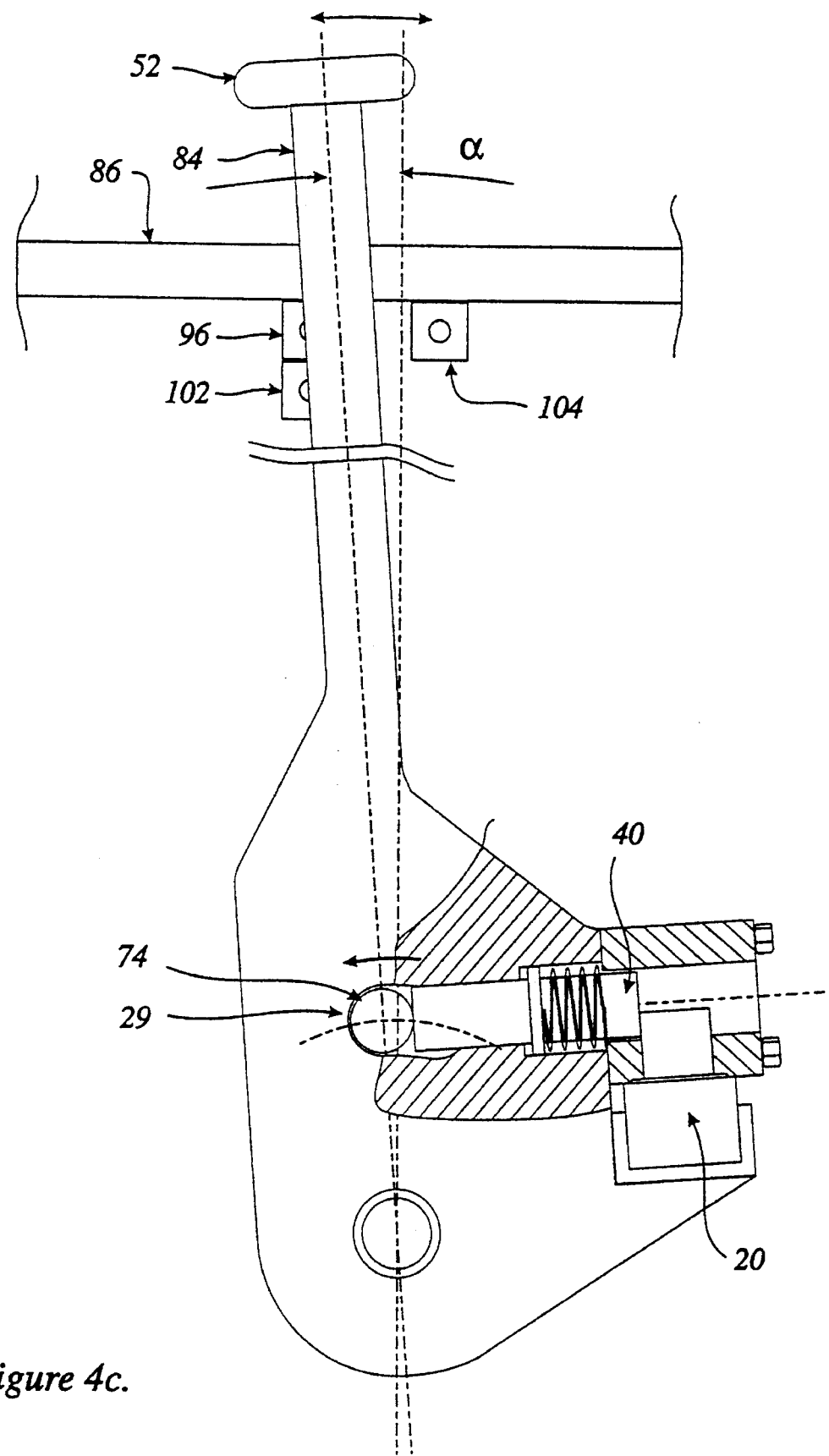

In the second position, illustrated in FIG. 4b, shift handle 52 has been moved to the first forward speed position indicated on the shifter quadrant 86. Motion of handle 52 from neutral to first speed causes main pin 40 to slide outward within cylindrical passage 36, since counter clockwise motion of first input plate 14 about stub shaft 12 moves kidney shaped slot 28 and cylindrical shaft 36 counter clockwise with respect to second pin 74. Since main pin 40 cannot move inward past second pin 74 the net effect is relative motion of main pin 40 outward along cylindrical passageway 36. In this outward position main pin 40 obstructs aperture 37 thereby preventing extension of the core of first solenoid 20. When handle 52 reaches the first speed position, or any higher forward speed position, it activates a microswitch 96 mounted to quadrant 84 causing solenoid 20 to energize. Although the core of solenoid 20 will be electromagnetically biased to extend across cylindrical passage 36, it will be temporarily prevented from doing so by the obstructing presence of main pin 40, as shown in FIG. 4b. Output plate 18 remains in the neutral position, and consequently the swash plate angle of the variable speed hydrostatic pump remains at zero, or neutral, as well. The automobile does not move, and output plate 18 remains unlocked with respect to first input plate 14, which is to say that motion of output plate 18 is independent of the motion of first input plate 14, at least within the range of relative motion permitted by the dimensions of kidney shaped slot 29.

As will be described below, in neutral the engine is usually running at idle before handle 52 is moved to the first, or higher, forward speed. As engine speed is increased by increasing fuel flow, again as will be described below, fixed output plate 18 will begin to rotate in a counter-clockwise direction about axis 11. As it does so second pin 74 will move toward the reverse end radius 29 of kidney shaped slot 28. This permits main pin 40, under the urging of spring 48, to recede inwardly along cylindrical slot 36 as main pin 40 follows, which is to say rides along, the side of and in linear contact with, the periphery of second pin 74. As second pin 74 approaches reverse end radius 29 main pin 40 will slide clear of aperture 37. Since the core of first solenoid 20 is still energized it will pop out to obstruct cylindrical passage 36. In this position main pin 40 is captured between the extended core of first solenoid 20 and the side of second pin 74. The shifter is thus considered locked in first speed since the swash plate angle now matches the selected speed angle, and will continue to be locked as long as main pin 40 is trapped by first solenoid 20. Shifting handle 54 to second speed will cause output plate 18 to move directly to second speed as well, and so on into third, fourth, and fifth forward speeds. In the locked condition output plate 18 moves with first input plate 16. One may note that had second or a higher forward speed been selected in the first instance a similar series of events would have occurred with the exception that the distance travelled outward along passage 36 by main pin 40, and the return arc travelled second pin 74, would both have been greater and the time and speed required to lock the swash plate into the chosen gear would have been longer and higher respectively than in for the first forward speed. Kidney shaped slot 29 is large enough that handle 52 may be moved to the highest forward speed, the fifth forward position shown in quadrant 86, without output plate 18 moving from the neutral position.

It is the process by which an increase in engine speed from the initial idle state with the output plate 18 and swash plate angle control shaft 84 in neutral, causes an increase in swash plate angle that will now be described, with reference to FIGS. 4a, 4b, 4c, and 6a. Second input plate 16 is connected to a throttle, or gas pedal 97, by means of an accelerator cable linkage 98, which has a return spring 100 fixed to adjacent structure, not shown in detail, to cause a return to idle when the gas pedal is released. The accelerator cable assembly is also directly linked to the fuel flow control, or carburettor butterfly valve, of a conventionally aspirated gasoline engine. Many similar fuel control systems, whether mechanical or solid state electrical are known for engines whether gasoline, diesel, steam or gas turbine.

Commencing at a first, idle position, as the accelerator is depressed it causes second input plate 16 to rotate from that idle position in a counter clockwise direction about pivot pin 58 mounted on an axis parallel to, but vertically displaced from axis 11, to an operating position at some higher engine speed than idle. Fulcrum 64 is located in blind hole 78 of output plate 18 to suspend counterweight 70 of latch 62 above second solenoid 72 mounted on second solenoid base plate 76 of output plate 18. When second solenoid 72 is extended it lifts counterweight 70, pivoting latch 62 about fulcrum 64 and causing hook 68 to engage catch pin 56 of second input plate 16. Thus if the core of second solenoid 72 is extended then motion of the accelerator pedal to increasing fuel flow will cause latch pin 56 to drag latch 62, fulcrum 64, and therefore the entirety of output plate 18, in a counterclockwise rotation about axis 11. For this mechanism to work the latch engages the catch in at least one direction, that corresponding to increasing fuel flow.

When gear handle 54 moves from neutral to the first forward speed it activates a second microswitch, 102, energizing second solenoid 72, thereby linking the motion of output plate 18, and consequently swash plate angle control shaft 94, to second input plate 16. As engine speed increases from idle output plate 18 will rotate counter-clockwise about axis 11 as described above, and eventually a second, locked position will be reached in which the angular rotation of output plate 18 matches that of first input plate 14. Once in the locked position solenoid 102 may be de-energized, permitting counterweight 70 to fall, and latch pin 56 to be released. Further motion of the speed selection handle 52 will cause corresponding motion of output plate 18, and therefore a change in swash plate angle. Once latch 62 is released the position of output plate 18 is indifferent to the position of the second input plate 16.

This process avoids sudden pressure surges. If handle 54 is moved to the first forward speed from neutral while the engine is revving above idle catch pin 56 will not be engaged. The engine must return to idle to permit hook 68 to engage catch pin 56. The use of shifter 10 in this way permits engine 3 and variable speed hydrostatic pump 5 co-operate to apply smoothly a relatively large start up torque to transaxle 8, and then to move to an higher speed, lower torque operating regime as the swash plate angle increases.

The inter-relationship of second pin 74, main pin 40, cylindrical passage 36 and solenoid 20 may be described as that of a cam surface, a cam follower, a cam follower retainer, and a catch or dog respectively. Second pin 74 need not be round but may present such cam profile as may be desired. Similarly main pin 40 and cylindrical passage 36 could be replaced by a number of arrangements of cam follower and cam follower retainer suited for co-operation with a cam surface. The core of first solenoid 20 may be protected by a cylinder head or cap, such that the core is not subject to lateral loads and wear directly. The mechanism will operate provide that extension of the core of solenoid 20 traps the cam follower against the cam to lock first input plate 14 with respect to output plate 18.

During deceleration or braking, it is desirable to stop driving the hydraulic motor. Therefore, the automotive system described includes a bypass microswitch 108, a pressure relief valve 110 which vents excess pressure to the reservoir 9, and a bypass valve 112 activated when gas pedal 97 is released, compressing bypass microswitch 108. This cuts off the high pressure flow to hydraulic motor 6 and re-directs that flow to reservoir 9.

Valve 108 is also activated at all times shift handle 54 is in the neutral position. For downward shifting the reverse end radius 29 of kidney shaped slot 28 will always pull second pin 74 in a clockwise direction. This does not impose any pressure surges in the system.

The smooth transition from neutral to first is not generally used to reach the higher speed ranges since the pressure shock from, for example, first speed to second, or second to third does not present the same problem as the step change from a dead stopped condition to first. Similarly the smooth transition function is need not necessarily be used in reverse since one does not generally wish to accelerate from zero in reverse with the same verve that one may wish when starting up in forward direction from, for example, a stoplight. In that case the pressure shock sent through the system is likely to be of lesser magnitude. Therefore in the first embodiment shifting handle 52 clockwise into reverse end radius 29 to pull second pin 74 clockwise about axis 11 and therefore to force the swash plate into its reverse range. Motion into reverse activates microswitch 104 which ensures that main pin 40 is locked between second pin 74 and solenoid 20 in the two speed reverse regime of the first embodiment, and also when handle 52 is once again moved in a counter-clockwise direction.

However in an alternative embodiment of the invention shown in FIGS. 1*b*, 4*d*, 5*b*, and 6*d*, the present invention is adapted for use in either the forward or reverse directions. Commencing with FIG. 5*b* one finds a speed selection quadrant 120 traversed by shaft 84 as before. Previous microswitches 96, 102, and 104 have been removed. Quadrant 120 comprises a rack assembly 122, itself comprising an upper grooved plate 124, a lower smooth plate 125, a ball carrier 126, spring loaded ball 127, and a retaining yoke 128. Yoke 128 is slidably attached to shaft 84 and pivotally attached to ball carrier 126 such that angular motion of handle 52 about axis 11 will result in translational motion of ball carrier 126 between upper grooved plate 124 and lower smooth plate 125. Upper, grooved plate 124 has a series of parallel grooves, or cusps 130, 131, 132, 133, 134, and 135 arrayed to correspond respectively to the N, 1, 2, 3, 4 and 5 speed positions of handle 52. Alignment of spring loaded ball 127 with any of those cusps will yield the desired detent effect. The 'R1' position is disposed laterally from the '2' position, and cusp 132 extends substantially the width of quadrant 120 give a detent in both positions.

A microswitch 136 is disposed on the underside of quadrant 120 to be contacted by a lateral striker plate 137, or other mechanical equivalent, affixed to shaft 84. This striker plate could as easily be affixed to microswitch 136. In operation motion of shaft 84 to the 'N' position will cause microswitch 136 to open i.e., it is a normally closed switch. When microswitch 136 is closed power will be supplied to first solenoid 20 as previously described. There are a number of alternative arrangements by which a shift lever, or linkage may continuously activate a microswitch over a range of motion.

A second, reverse, microswitch 138 is disposed behind quadrant 120 for contact by a striker plate 139 during such time as shaft 84 is located in the portion of quadrant 120 running to the 'R1' position. Microswitch 138 is closed at all times that reverse operation is selected.

Figure 4D:
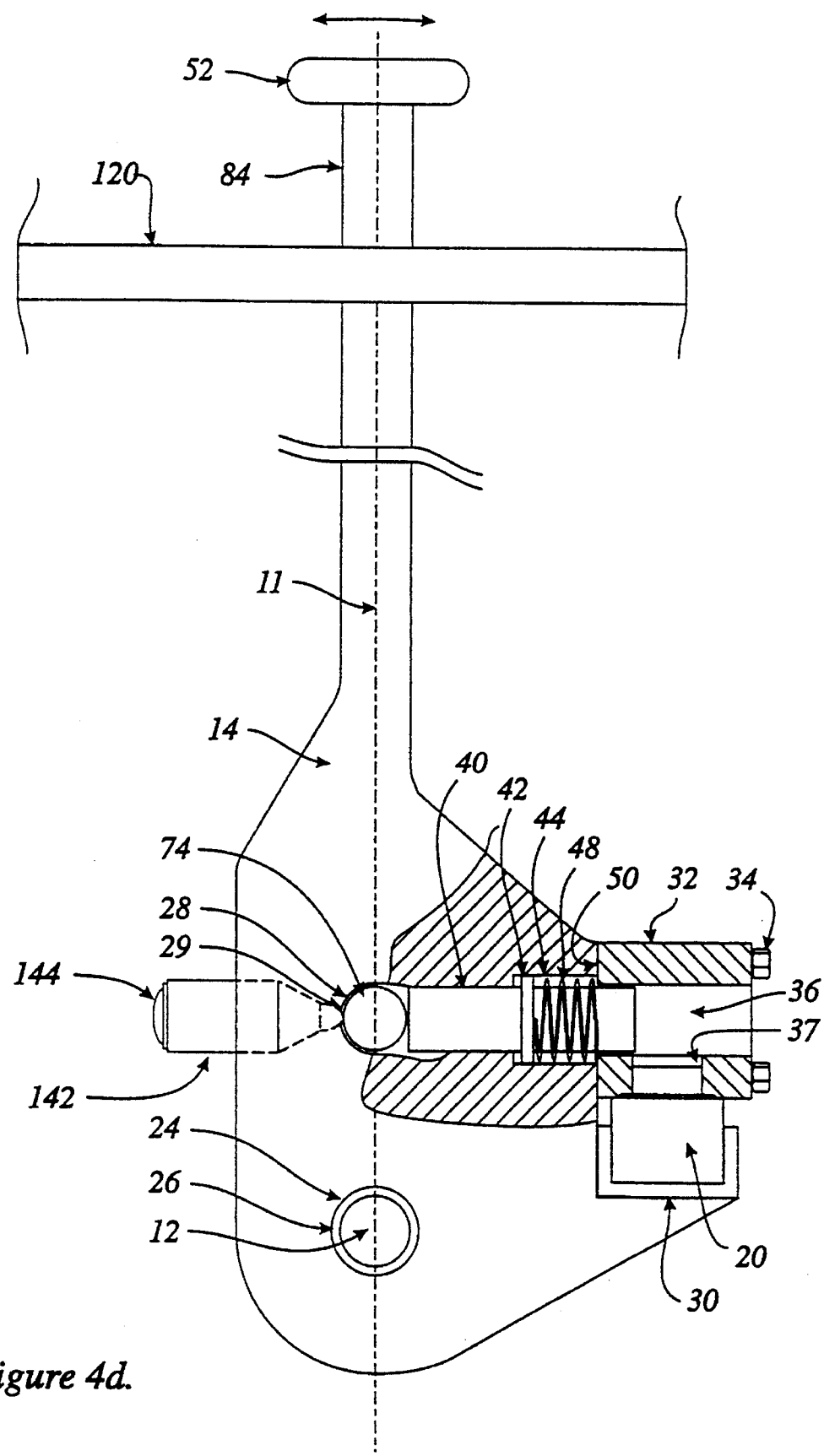

A third microswitch 142 is mounted transversely to first input plate 14 opposite cylindrical passage 36 as shown in FIG. 4*d*, such that its retractable extending prong extends into kidney shaped slot 28. When second pin 74 is most closely adjacent reverse end radius 29, as occurs, for example, when main pin 40 is locked between the core of solenoid 20 and second pin 74, microswitch 142 is open. When second pin 74 moves away from end radius 29 microswitch 142 is closed and power is provided to second solenoid 76. A light 144 is provided which indicates when solenoid 76 is energized. This light may be mounted on the rear of microswitch 142 or may be mounted on the face of quadrant 120 as desired Thus during a series of steps analogous to those illustrated in FIGS. 4*a*, 4*b*, and 4*c* microswitch 142 will close when selector handle 52 is moved from neutral to either first speed or reverse. Second solenoid 76 will extend, pivoting latch 62 to capture catch 56 with hook 68, linking second input plate 16 to output plate 18. As engine speed is increased output plate 18 will rotate counter-clockwise about axis 11, increasing the swash plate angle. This will continue until second pin 74 reaches the locked position, contacting, and thereby opening, microswitch 142 to de-energize second solenoid 76.

Figure 6A:
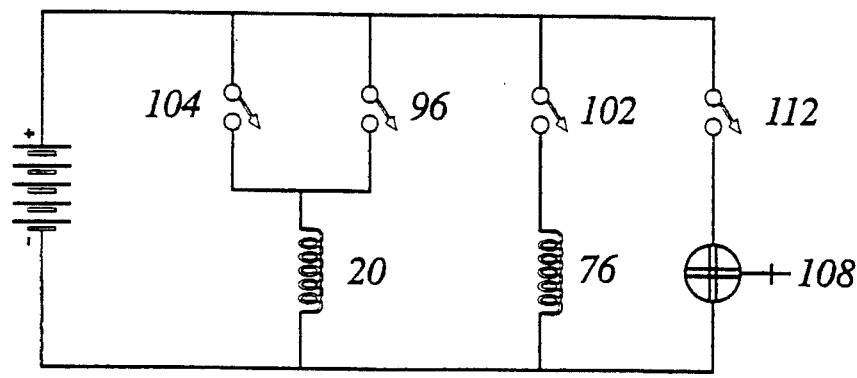
FIG. 6, being 6a and 6b, shows wiring of the Shifter of FIG. 1.
Figure 6B:
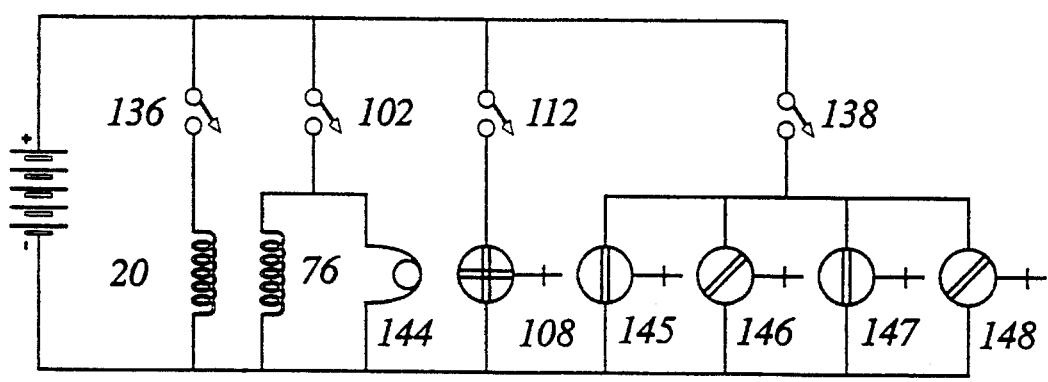

Finally, a series of hydraulic valves 145, 146, 147, and 148 are shown. Valves 145 and 147 are normally open, and valves 146 and 148 are normally closed. In normal, de-energized operation hydraulic fluid from the high pressure side of the hydraulic pump will cause the hydraulic motor, and ultimately the wheels, to turn in a forward direction. Closure of reverse microswitch 136 causes valves 145, 146, 147, and 148 to energize, with the net effect of reversing the flow to hydraulic motor 6, thereby driving the wheels in reverse. This is illustrated in FIG. 6*b*. Thus the advantages of a smooth start up torque are obtained in both forward and reverse operation of the vehicle.

In both embodiments the smooth engagement from the stopped condition is achieved by using a two stage speed control system. There are two input controls, the first being the speed selector handle 52 angle, and the second being the fuel control, in this case gas pedal 97. In the first stage, starting from a dead stop, the system operates in a fuel control mode whereby position of the output plate, and therefore the swash plate, is directly linked to fuel flow. When operating in this mode the output plate is indifferent to the position of the speed selection handle.

In the second stage the output plate is locked relative to the speed selector handle 52, and is disconnected from the fuel flow control. As such, once the speed range is selected by positioning the speed selector handle the automobile will speed up and slow down according to changes in fuel flow but will continue to operate along a particular torque vs. speed characteristic curve without changing the angle of the swash plate. The position of the output plate is indifferent to changes in fuel flow.

Operation in each of these stages is permitted by use of the detachable mechanical or electromechanical linkages and selective activation and de-activation of their respective solenoids.

In the preferred embodiment the engine is a Briggs & Stratton 16 h.p. V-twin Vanguard, the Hydraulic Pump is an Eaton 1.24 cu. in. Variable Speed Hydraulic Pump, the Hydraulic Motor is a 4.2 cu. in. Eaton Charlyn rated at 17 g.p.m., the Gear Increaser is a 1 to 3 Tsubaki Gear Increaser, and the hydraulic reservoir has a capacity of 5 gallons. In tests the preferred embodiment has been used to drive a small automobile platform in excess of 35 m.p.h.

While particular and preferred embodiments of the present invention are described, it is contemplated that various changes in materials and arrangement of the various parts may be made by those skilled in the art are within the spirit and scope of the present invention.

I claim:

1. An hydraulic shifter for use with a variable speed hydrostatic pump driven by an engine comprising a fuel flow control, said pump comprising a swash plate and a swash plate angle adjustment shaft, said shifter for achieving smooth engagement from a stopped condition, said shifter comprising:

an output plate fixedly mounted to said adjustment shaft;

a first input plate;

a second input plate;

a first interconnection means for detachably linking said output plate to said first input plate, said first interconnection means movable from a first, unlocked position, to a second, locked position;

a second interconnection means for detachably linking said output plate to said second input plate, said second interconnection means movable from an engaged position to a disengaged position;

said first input plate movable from a neutral position to a first speed position while a) said second input plate is in an idle position, and b) said first interconnection means is unlocked; said first input plate in said first speed position causing said second interconnection means to move to said engaged position;

said second input plate, with said second interconnection means engaged, movable to move said output plate from an idle position to an operating position to move said first interconnection means to said locked position to lock said first input plate to said output plate, and to cause said second interconnection means to disengage.

2. The hydraulic shifter of claim 1 wherein:

said first input plate comprises a speed selection handle and, when said second interconnection means is engaged, said output plate is linked to said fuel flow control.

3. The shifter of claim 2 wherein when said first interconnection means is locked and said second interconnection means is disengaged, said first input plate is movable to move said output plate independently of said second input plate.

4. The shifter of claim 2 wherein:

said output plate comprises a cam member;

said first input plate comprises a cam follower passage;

said first interconnection means comprises a cam follower disposed for sliding motion within said passage and for riding upon said cam member when so disposed, and a first solenoid movable from a retracted position to an extended position;

said first solenoid in said extended position obstructing said passage to limit motion of said cam follower.

5. The shifter of claim 2 in which:

said handle comprises a shaft;

said shaft traverses a speed selector quadrant;

said quadrant comprises a neutral position and at least one forward speed position;

said quadrant comprises a first microswitch disposed to be closed when said shaft is in a position corresponding to said forward speed position;

said microswitch connected in series with said first solenoid whereby motion of said handle to said forward speed position causes said first solenoid to energize.

6. The hydraulic shifter of claim 1 wherein:

said shaft extends along an axis of rotation;

said second input plate comprises a pivot for pivotal motion of said second input plate in a plane perpendicular to said axis of rotation; said second input plate comprises a catch;

said second interconnection means comprises a second solenoid movable from a retracted position to an extended position and having a body rigidly affixed to output plate, and a latch pivotally suspended from said output plate;

said latch having a first arm for engaging said second solenoid and a second arm having a hook for engaging said catch whereby in said extended position of said solenoid said hook engages said catch whereby motion of said second input plate in at least one direction about said pivot causes motion of said output plate about said axis.

7. The hydraulic shifter of claim 6 wherein said first input plate comprises a speed selector handle having a shaft;

said shaft traversing a speed selector quadrant;

said quadrant comprising a neutral position and at least one forward speed position;

said quadrant comprising a second microswitch disposed adjacent said forward position;

said microswitch positioned to be closed when said shaft is moved from a position corresponding to said neutral position to a position corresponding to said forward speed position;

said microswitch in electrically connected in series with said second solenoid whereby motion of said shaft from neutral to said forward speed position closes said second microswitch and energizes said second solenoid.

8. The hydraulic shifter of claim 6 wherein:

said first input plate comprises a speed selector handle having a shaft, said shaft traversing a speed selector quadrant said quadrant having a neutral position, at least one reverse position and at least one forward speed position;

said shifter comprises a first, neutral position microswitch in series with said first solenoid;

said first input plate comprising a second microswitch for intermittently contacting said second pin, said second microswitch in series with said second solenoid;

hydraulic valves intermediate and in fluid communication with said hydrostatic pump and said hydraulic motor, said valves co-operatively movable from a first, forward position in which they direct hydraulic fluid to drive said motor in a first direction, to a second, reverse position in which they direct hydraulic fluid to drive said motor in a second, opposite direction;

said quadrant comprising a third microswitch activated by said shaft in said reverse position to move said valves from said first position to said second position.

9. The hydraulic shifter of claim 6 wherein:

said first input plate is disposed for pivotal motion about said axis of rotation parallel to said output plate, said first input plate comprising a cam follower passage;

said output plate comprises a cam member;

said first interconnection means comprises a cam follower disposed for sliding motion within said passage and for riding upon said cam member when so disposed, and a first solenoid movable from a retracted position to an extended position; said first solenoid in said extended position obstructing said passage to limit motion of said cam follower.

10. The hydraulic shifter of claim 1 wherein:

said shaft extends along an axis of rotation said first input plate and said output plate are pivotable about said axis of rotation with respect to each other from an unlocked position to a locked position;

said first interconnection means comprises a pin having an axis parallel to and offset from said axis of rotation, said pin rigidly and normally mounted to said output plate;

said first input plate comprises a microswitch;

said second interconnection means comprises a solenoid movable from a de-energized, retracted position to an energized, extended position, said solenoid in series with said microswitch;

in said locked position of said first input plate relative to said output plate said pin engaging said microswitch to de-energize said solenoid.

11. An automobile having a drive train comprising a variable speed hydrostatic pump and an hydraulic motor, said hydraulic pump comprising a swash plate, swash plate control shaft and a shifter mounted co-axially with said shaft, said shifter for achieving smooth engagement of said drive train from a stopped condition of said automobile, said shifter comprising:

a first input plate;

a second input plate;

an output plate fixedly mounted to said control shaft;

a first interconnection means for detachably connecting said first input plate to said output plate, said first interconnection means movable from a first, unlocked position to a second, locked position;

a second interconnection means for detachably connecting said second input means to said output plate, said second interconnection means movable from an engaged position to a disengaged position;

while a) said second input plate is in an idle position and b) said first interconnection means is locked, said first input plate movable from a neutral position to a first speed position to cause said second interconnection means to move to an engaged position;

with said second interconnection means engaged, said second input plate movable to move said output plate from said idle position to an operating position to cause said first interconnection means to lock said first input plate to said output plate and to disengage said second interconnection means.

12. The automobile of claim 11 wherein said first input plate comprises a speed selector handle and said second input plate is linked to a fuel flow control.

13. The automobile of claim 12 wherein said speed selector handle cooperates with a speed selector quadrant having forward, reverse, and neutral speed ranges.

14. The automobile of claim 13 comprising hydraulic valves intermediate and in fluid communication with said hydrostatic pump and said hydraulic motor, said valves co-operatively movable from a first, forward position in which they direct hydraulic fluid to drive said motor in a first direction, to a second, reverse position in which they direct hydraulic fluid to drive said motor in a second, opposite, direction, said quadrant comprising a reverse microswitch activated by said handle in said reverse range to move said valves from said first position to said second position.

15. A method for shifting a motor driven hydrostatic pump smoothly from an idle condition to a fixed swash plate angle speed range using a shifter comprising an output plate, a first input plate, a second input plate, a first interconnection means for detachably linking said output plate to said first input plate, a second interconnection means for detachably linking said second input plate to said output plate, said method comprising:

moving said first input plate to a first, neutral position and moving said second input plate to a first, idle position to ensure said output plate rests in a first, neutral position;

moving said first input plate to a second, first-speed position;

activating said second interconnection means to obstruct motion of said output plate in at least one direction;

moving said second output plate to drag said output plate toward said second, first speed position of said first input plate;

contemporaneously increasing the speed of said motor as said second output plate moves;

aligning said output plate with said first input plate;

moving said first interconnection means to a locked position to lock said output plate in position relative to said first input plate; and releasing said second interconnection means.

* * * * *